(12) United States Patent
Wu

(10) Patent No.: US 6,381,370 B1
(45) Date of Patent: Apr. 30, 2002

(54) METHOD AND APPARATUS FOR IMAGE ENCODING

(75) Inventor: Zhixiong Wu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/112,199

(22) Filed: Jul. 9, 1998

(30) Foreign Application Priority Data

Jul. 14, 1997 (JP) .............................................. 9-188296

(51) Int. Cl.⁷ ................................................ G06K 9/36
(52) U.S. Cl. ...................................... 382/243; 382/240
(58) Field of Search ............................... 382/232–240, 382/248, 247, 244, 243, 199

(56) References Cited

U.S. PATENT DOCUMENTS

| | | | | |
|---|---|---|---|---|
| 5,864,630 A | * | 1/1999 | Cosatto et al. ............... | 382/103 |
| 5,867,602 A | * | 2/1999 | Zandi et al. ................ | 382/248 |
| 5,870,502 A | * | 2/1999 | Bonneau et al. ............ | 382/249 |
| 5,909,518 A | * | 6/1999 | Chui .......................... | 382/277 |
| 5,949,912 A | * | 9/1999 | Wu ............................. | 382/246 |
| 5,974,184 A | * | 10/1999 | Eifrig et al. ................ | 382/236 |
| 6,128,344 A | * | 10/2000 | Aono et al. ................. | 375/240 |

OTHER PUBLICATIONS

Stephane G. Mallat, "A Theory for Multiresolution Signal Decomposition: The Wavelet Representation", IEEE Transaction on Pattern Analysis and Machine Intelligence, vol. 11, No. 7, Jul. 1989, pp. 674–693.

* cited by examiner

*Primary Examiner*—Bhavesh Mehta
*Assistant Examiner*—Ali Bayat
(74) *Attorney, Agent, or Firm*—Venable; Robert J. Frank; Paul Daebeler

(57) ABSTRACT

A shape adaptive wavelet transform is performed on a digitized image signal representing an image. First, a shape information is obtained about the image, and the shape information is applied to a shape adaptive wavelet filter. The shape adaptive wavelet filter detects a starting point and an ending point of the image. The digitized image signal is divided into a low-frequency component and a high-frequency component. Then each frequency component is sampled, using the shape information. The shape adaptive wavelet filter then generates converted shape information indicating the shape for each sampled frequency component.

12 Claims, 5 Drawing Sheets

METHOD AND APPARATUS FOR IMAGE ENCODING

FIELD OF THE INVENTION

The present invention relates to a method and apparatus for image encoding. More specifically, it relates to a method and apparatus employing a wavelet transform technique for image encoding.

BACKGROUND OF THE INVENTION

Image compression methods using the discrete cosine transform have been standardized by the Joint Photographic Experts Group (JPEG) and Moving Picture Experts Group (MPEG).

Recently, however, there has been much interest in alternative image compression methods that use the wavelet transform technique. The wavelet transform iteratively separates low spatial frequencies from high spatial frequencies, to produce a multiresolution representation of an image. For many images, the wavelet transform offers the possibility of a higher compression ratio than the discrete cosine transform.

For example, Stephane Mallat, "A Theory for Multiresolution Signal Decomposition: The Wavelet Representation", IEEE Trans. PAMI, Vol. 11, November 7, July 1989. pp 674–693 discloses a method for wavelet transform of images.

A conventional multi-level multi-dimensional wavelet filter for wavelet transform is constructed by connecting a plurality of base wavelet transformers in cascade. The base wavelet transformer performs a single-level one-dimensional wavelet transform. The base wavelet transformer is comprised of a single-level one-dimensional wavelet filter.

A problem is that the conventional method works only with rectangular images. If an image is not rectangular, the image must be embedded in a rectangle, and the non-image parts of the rectangle must be filled in with, for example, the average value of the image signal, or with signal values copied from the border of the image.

However, the compression efficiency of the resulting rectangular image tends to be impaired. This is because a large gap may occur between the image and the filled-in area, and more pixels than the original image area need to be encoded and transmitted. As a result, a large number of bits are required to encode the image.

SUMMARY OF THE INVENTION

Accordingly, it is an object of the present invention to execute a wavelet transform on an inputted image with an arbitrary shape.

It is another object of the present invention to provide a wavelet transform on an inputted image with high coding efficiency.

According to a first aspect of the present invention, a shape adaptive wavelet transform is executed on inputted images. First, a shape information of the image is obtained, the shape information containing at least a starting point and an ending point of a consequent image area of the image. Then, the image is filtered and divided into a plurality of resolutions, and each resolution is sub-sampled to obtain a sub-sampled signal. The shape information is converted to a new shape information, which indicates positions at which the sub-sampled image signal exists. Thereby, a one-dimensional wavelet transform on each line of the image is performed.

According to a second aspect of the present invention, an N-level shape adaptive wavelet transform is executed on inputted images. To the wavelet transformer of the invention, the image signal and shape information thereof are inputted. The first stage wavelet transformer generates first and second sampled signals and feeds them into next stages. The second and third stages execute wavelet transforms on the first and second sampled signals, respectively.

DESCRIPTION OF THE PREFERED EMBODIMENT

Embodiments of the present invention will now be described with reference to the attached drawings.

Figure 1:
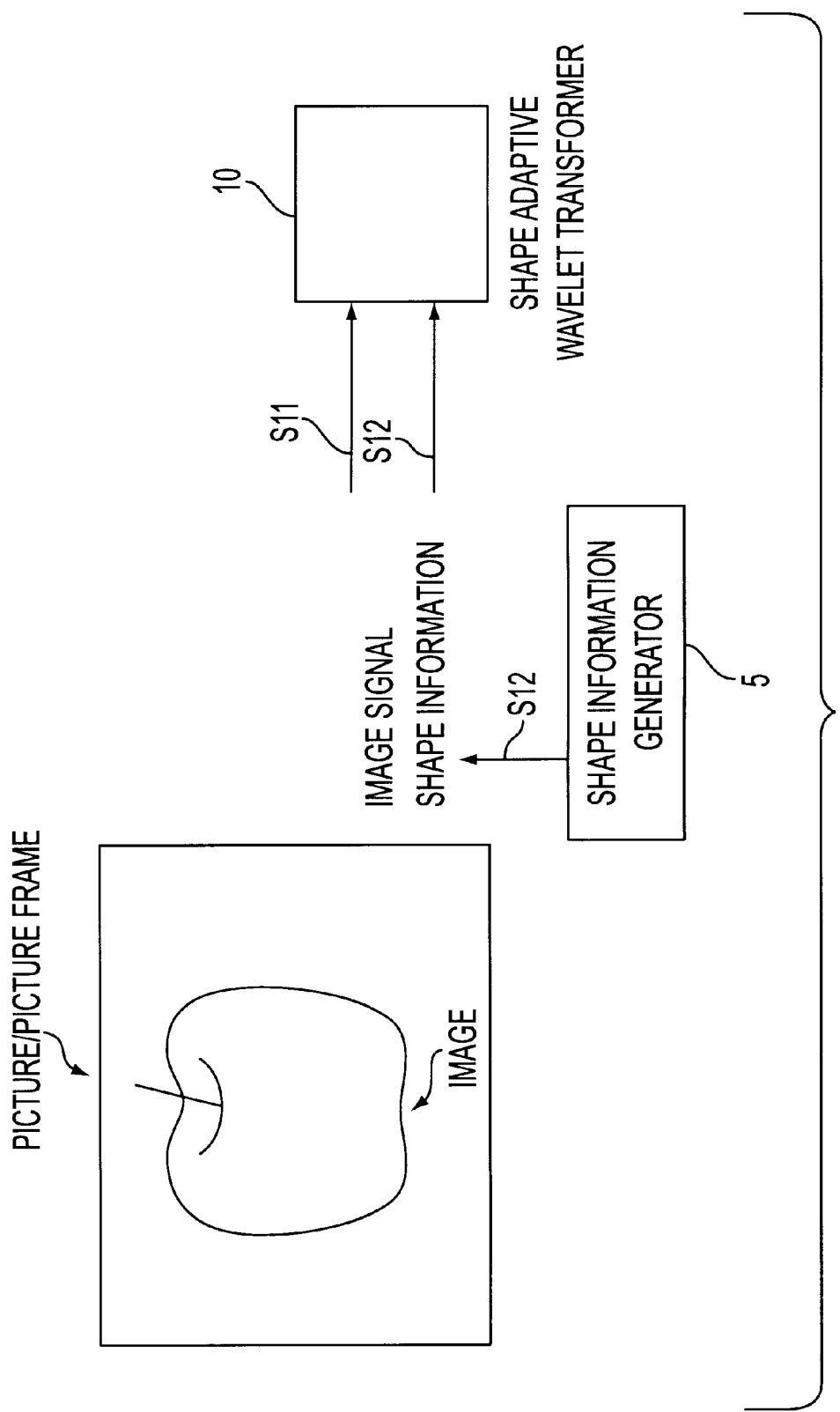
FIG. 1 illustrates a general structure of the present invention.

The shape adaptive wavelet transformer receives a digitized signal representing a rectangular still picture, or a single rectangular frame in a moving picture, or the difference between two rectangular frames in a moving picture. Typically, as shown in FIG. 1, an image is indicated in such rectangular still picture or picture frame. The embodiments of the present invention carry out a wavelet transform on such images with arbitrary shapes.

According to the first embodiment of the present invention, image signal s11 and shape information s12 of the image signal are generated from the picture or picture frame. The image signal s11 gives the value of each pixel in the picture frame. In the embodiment, the image signals s11 can be raster-scanned data of the picture or picture frame. Namely, the image signal s11 is one-dimensional. The image signal s11 is inputted to a one-dimensional shape adaptive wavelet transformer 10.

The shape information s12 describes the shape of the image. In other words, the shape information s12 indicates which part of the image signal s11 belongs to the image. The shape information comprises, for example, a rectangular bit mask, or a run-length encoding of such a bit mask. A shape information generator 5 generates such shape information s12 and applies it to the shape adaptive wavelet transformer 10.

Figure 2:
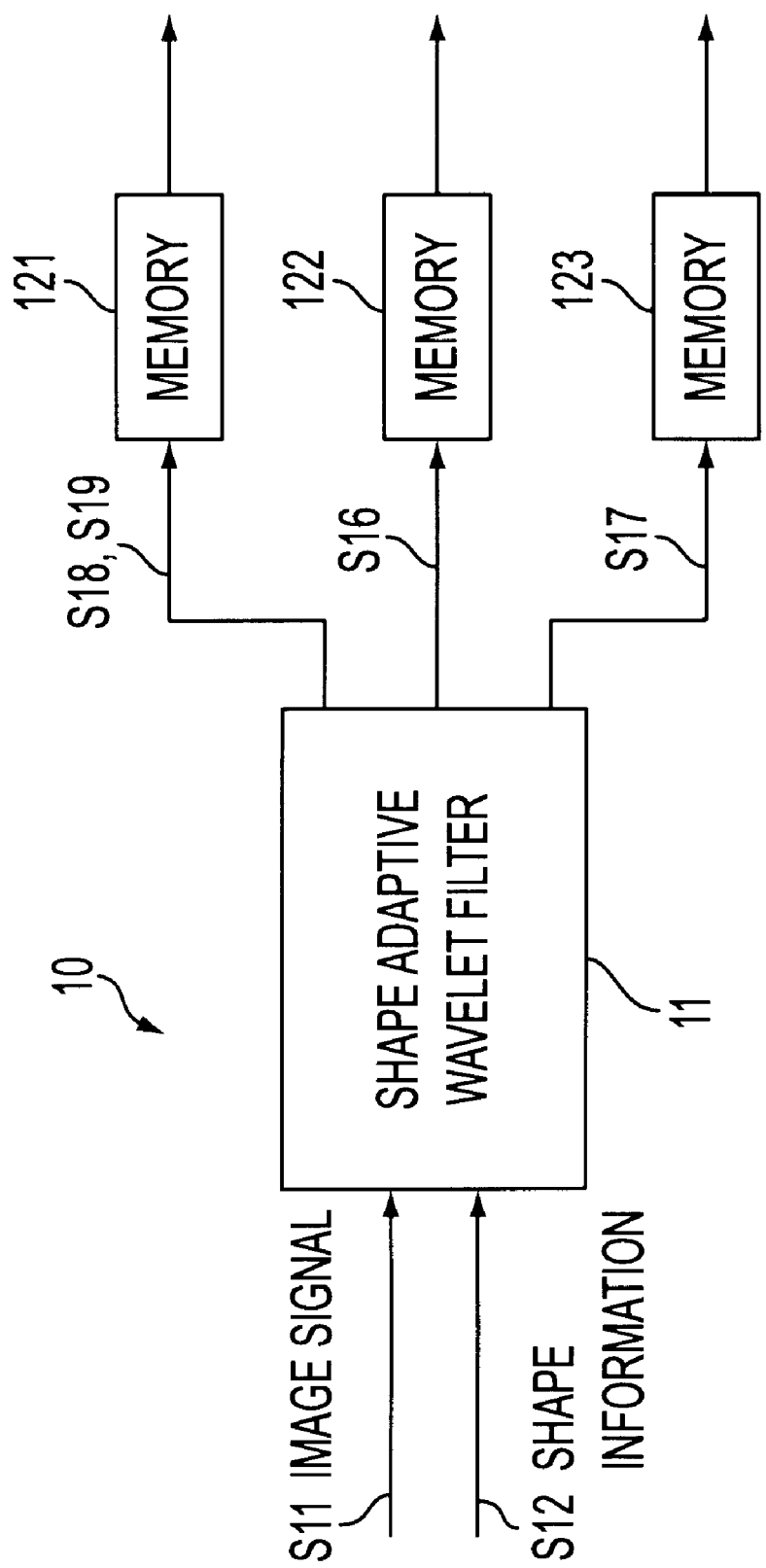
FIG. 2 shows a first embodiment of the shape adaptive wavelet transformer of the present invention.

First, a block diagram of one embodiment of the present invention is shown in FIG. 2. The first embodiment is a one-dimensional shape adaptive wavelet transformer 10 having a shape adaptive wavelet filter 11. To the shape adaptive wavelet filter 11, image signal s11 and shape information s12 of the image signal are inputted.

The shape adaptive wavelet transformer 10 further has a first memory 121, a second memory 122, and a third memory 123. These memories are connected to the shape adaptive wavelet filter 11.

Figure 3:
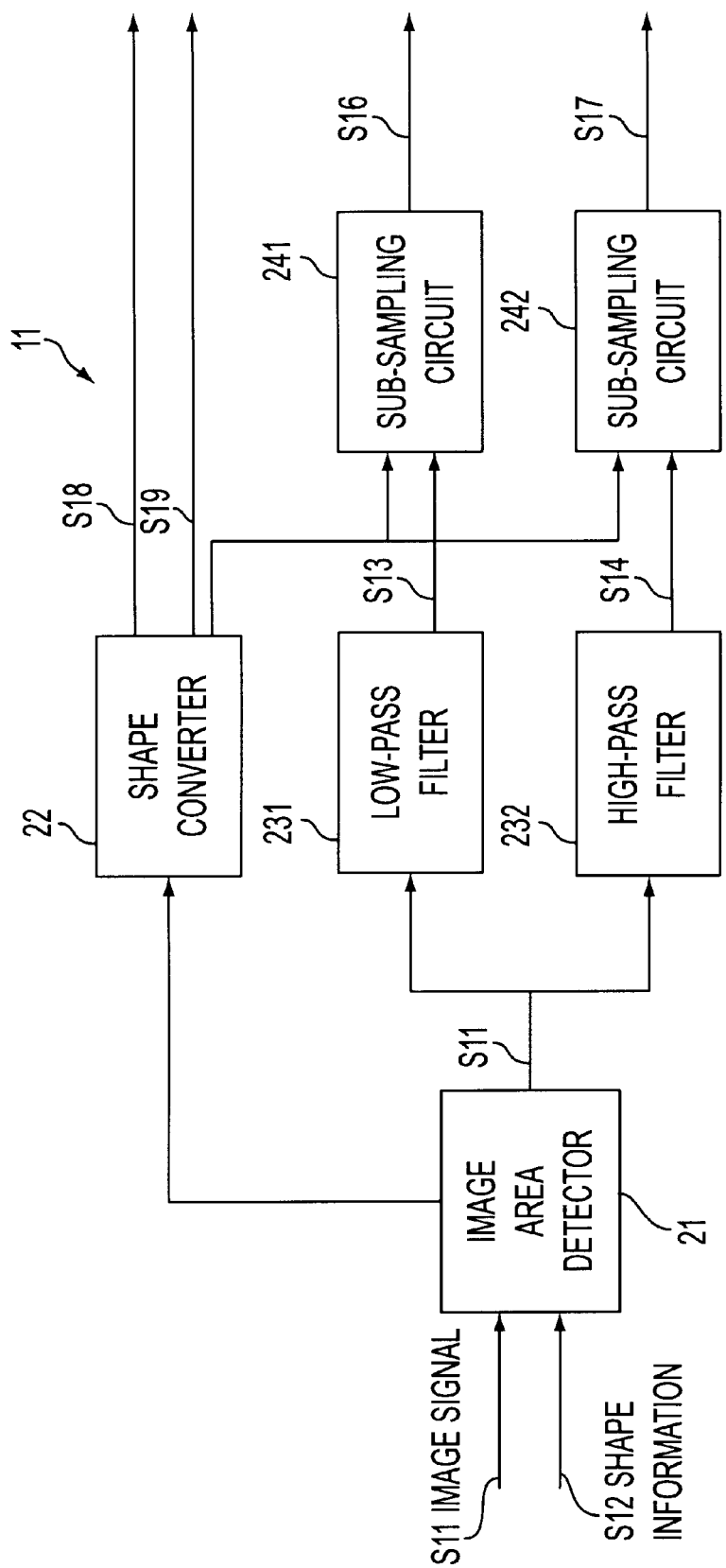
FIG. 3 shows a detailed block diagram of the shape adaptive wavelet filter in FIG. 2.

FIG. 3 shows a detailed block diagram of the shape adaptive wavelet filter 11. As shown in FIG. 2, the input image signal s11 and the shape information s12 are applied to an image area detector 21. The image area detector 21 detects a consequent image area in the inputted image signal s11. More specifically, the image area detector 21 determines a starting point Si and an ending point Sj, where i is a positive integer, of the image. The image area detector 21 then determines the area between the starting point Si and the ending point Sj as a consequent image area.

The starting point Si and the ending point Sj mean locations from an anchor point. Typically, for example, the anchor point can be the upper-leftmost point of an inputted image frame. Or, in this embodiment, since the image signal s11 is one-dimensional, the anchor point can be determined as the leftmost point of the inputted image signal. The starting point Si and the ending point Sj can be indicated as a number of pixels from the anchor point.

The image area detector 21 then applies the detected starting point Si and the ending point Sj to a shape converter 22. The image area detector 21 further outputs the image signal s11 to a low-pass filter 231 and a high-pass filter 232.

The low-pass filter 231 receives the image signal s11 of a consequent image area from the image area detector 21. Then, the low-pass filter 231 filters the inputted signal and outputs the low-frequency component thereof (s13) by the following equation (1), where h(k) means a filter coefficient of the low-pass filter 231 k represents the nth pixel in a digitized image, nl, ml represent the length of the low-pass filter, and i represents the position of a pixel:

$$S_{t+1}(i) = \sum_{k=-nl}^{ml} S_t(i+k)h(k) \tag{1}$$

On the other hand, the high-pass filter 232 filters the inputted image signal s11 and outputs the high-frequency component thereof (s14) by the following equation (2), where g(k) means a filter coefficient of the high-pass filter 232 and nh,mh represent the length of the high-pass filter:

$$W_{t+1}(i) = \sum_{k=-nh}^{mh} S_t(i+k)g(k) \tag{2}$$

The filtered low-frequency component s13 is fed to the sub-sampling circuit 241, while the filtered high-frequency component s14 is fed to the sub-sampling circuit 242. As the result, each of the two output signals s13 and s14 each have half the resolution of the input signal s11.

The shape converter 22 instructs the sub-sampling circuit 241 to generate a first sampling signal s16. The shape converter 22 also instructs the sub-sampling circuit 242 to generate a second sampling signal s17.

Upon receiving the instruction, the sub-sampling circuit 241 generates the first sampling signal s16. The first sampling signal s16 is generated by outputting the pixels located in the "even" positions refering to the anchor point. Then the first sampling signal s16 is applied to the second memory 122.

The second sampling signal s17 is generated by outputting the pixels having "odd" position refering to the anchor point. Then the second sampling signal s17 is applied to the third memory 123.

The first sampling signal s16 is stored in the second memory 122. The start address to which the first sampling result is stored corresponds to S1/2. The second sampling result is stored in the third memory 123. The start address to which the second sampling signal s17 is stored corresponds to (S1−1)/2.

For example, suppose that the inputted image signal s11 has a consequent image area with starting point "9" and ending point "16", the sub-sampling circuit 241 outputs pixels positioned at 10, 12, 14, and 16 as the first sampling signal s16. These pixels are stored in the second memory 122, at the addresses corresponding to 5, 6, 7, and 8, respectively. The sub-sampling circuit 242 outputs pixels positioned at 9, 11, 13, and 15 as the second sampling signal s17. These pixels are stored in the third memory 123, at addresses corresponding to 4, 5, 6, and 7, respectively.

As explained above, it should be understood that the first sampling signal s16 contains pixels having "even" positions of the low-frequency component of the inputted image signal s11. On the other hand, the second sampling signal s17 contains pixels having "odd" positions of the high-frequency component of the inputted image signal S11.

The shape converter 22 further outputs converted shape information s18 and s19 to the first memory 121. The converted shape information indicates output positions of the low-frequency component and the high-frequency component, respectively.

Figure 4:
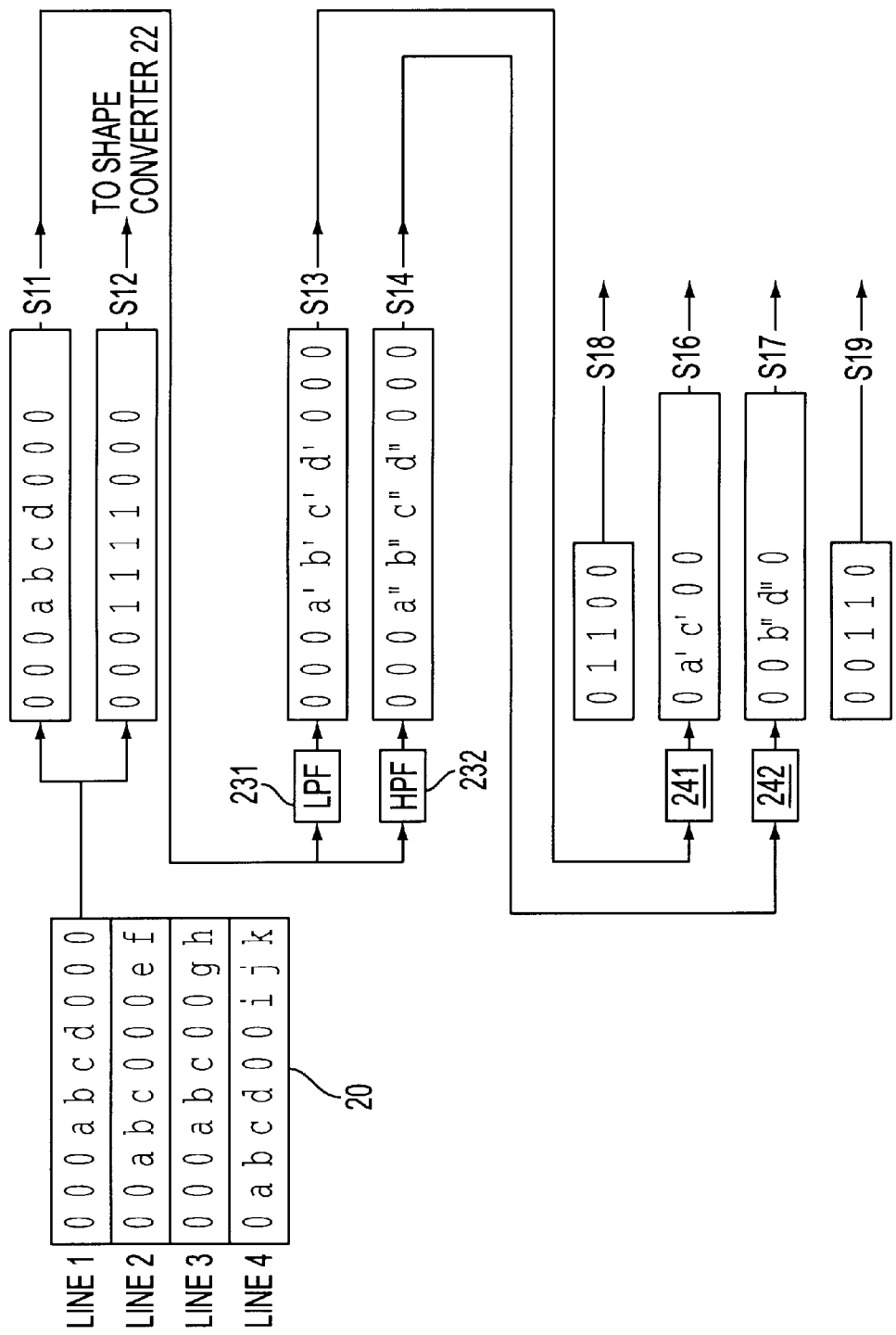
FIG. 4 shows a proccess for implementing the shape adaptive wavelet transform of the present invention.

The above explained function is explained again with reference to FIG. 4. In FIG. 4, a digitized picture frame 20 which contains 4 lines is shown. Each line contains 10 pixels. In FIG. 4, pixels inside the image are digitized and indicated as a,b,c, . . . k. The remaining six pixels, that are at the outside of the image, are indicated as 0.

Now, suppose that Line 1 of the digitized picture frame 20 is inputted to the shape adaptive wavelet transformer 10. In Line 1 of the digitized picture frame 20, an image exists on, from fourth to seventh pixel. Therefore, the generated image signal s11 is [0, 0, 0, a, b, c, d, 0, 0, 0]. The generated shape information s12 is [0, 0, 1, 1, 1, 1, 0, 0, 0]. When the shape information s12 is inputted to the image area detector 21, it detects the fourth pixel as the starting point Si, and the seventh pixel as the ending point Sj. The starting point Si and the ending point Sj are fed to the shape converter 22.

The image signal s11 is applied to both the low-pass filter 231 and the high-pass filter 232. After the filtering process, the low-frequency component s13 becomes [0, 0, 0, a', b', c', d', 0, 0, 0], while the high-frequency component s14 becomes [0, 0, 0, a", b", c", d", 0, 0, 0]. The low-frequency component s13 and the high-frequency component s14 are applied to the sub-sampling circuit 241 and 242, respectively.

The sub-sampling circuit 241 outputs pixels located at "even" position, while the sub-sampling circuit 242 outputs pixels located at "odd" position. As the result, the first sampling signal s16 is [0, a', c', 0, 0], while the second sampling signal s17 is [0, 0, b", d", 0].

The shape converter 22 generates converted shape information s18 and s19. The converted shape information s18 and s19 describes the shape of the first and the second sampling signal s16 and s17, respectively.

According to the first embodiment, images with arbitrary shapes can be wavelet transformed with the shape maintained. The embodiment provides a more efficient transform than the conventional method, since the invention of this embodiment transforms only pixels belonging to the image. Thus, the embodiment reduces the number of transform calculations.

When the input signal represents a two-dimensional image, wavelet filtering is performed separately on each dimension. The second embodiment of the present invention is for performing a two-level shape adaptive wavelet transform on a two-dimensional image signal. The block diagram of the second embodiment is shown in FIG. 5.

Figure 5:
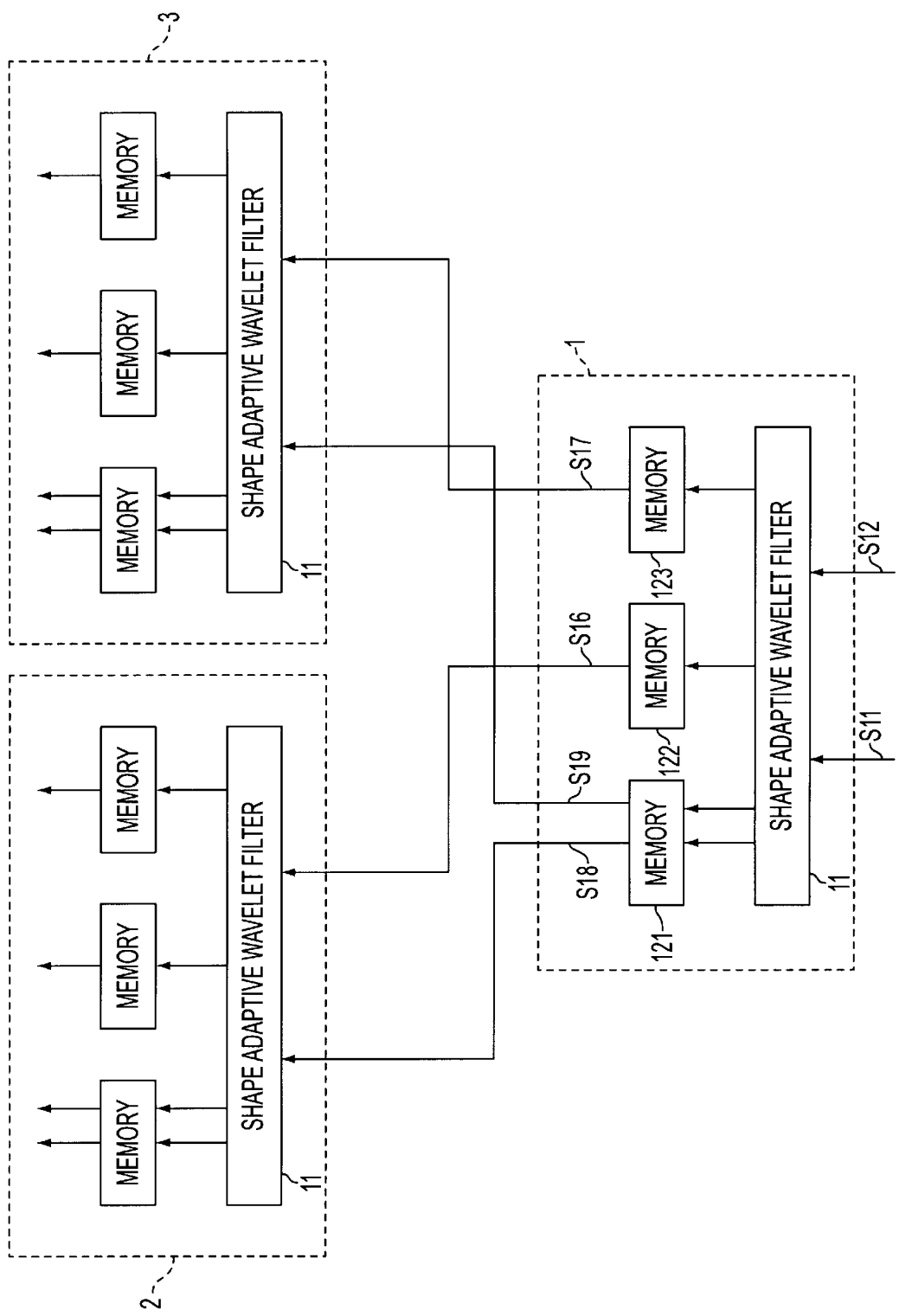
FIG. 5 shows a second embodiment of the shape adaptive wavelet transformer of the present invention.

As shown in FIG. 5, the wavelet transformer of the second embodiment has three stages 1, 2, and 3. The configuration of each stage is essentially the same as that of the first embodiment, so a detailed explanation is omitted.

First, the input image signal s11 and the shape information s12 are inputted to the first stage 1. The stage 1 performs a shape adaptive wavelet transform in the same manner as the first embodiment.

The shape adaptive wavelet filter 11 of stage 1 outputs the first sampling signal s16, second sampling signal s17, and converted shape information s18 and s19. In the second embodiment, all the lines of the image are wavelet transformed and the resultant data are stored in the memory 121, 122, and 123.

After all lines are wavelet transformed, the memory 121 of the first stage 1 applies the converted shape information s18 to the second stage 2, and the converted shape information s19 to the third stage 3. Further, the first sampling signal s16 is applied to the second stage 2 from the memory 122, and the second sampling signal s17 is applied to the third stage 3 from the memory 123.

Namely, the stage 1 performs, for example, a single-level one-dimensional wavelet transform on each horizontal line of the input image. Then, the pixels having an "even" absolute position of the low-frequency component are fed to the second stage 2. The pixels having an "odd" absolute position of the high-frequency component are fed to the third stage 3. In addition, the converted shape information s18, which indicates the positions of the first sampling signal s16, is also fed to the second stage 2. Further, the converted shape information s19, which indicates the positions of the second sampling signal s17, is also fed to the third stage 3.

Thus, the second stage 2 and the third stage 3 performs a single-level one-dimensional wavelet transform on each vertical line of half the resolution of the image signal s11. Then, the second stage and the third stage output the transformed results, respectively.

According to the second embodiment, a two-dimensional image is first transformed horizontally, then transformed vertically, or vice versa. Thus, a multi-dimensional wavelet transform is effectively performed.

Other variations are possible in the preceding embodiments. For example, the "even" and the "odd" position can be alternative with respect to each other. Namely, the sub-sampling circuit 241 can output pixels having an "odd" absolute position and the sub-sampling circuit 242 can output pixels having an "even" absolute position.

The plurality of wavelet transformers of FIG. 5 can be disposed in parallel. As a result, the plurality of lines of an image can be wavelet transformed simultaneously, thereby reducing total coding time. Further, the low-pass filter 231 and the high-pass filter 232 can employ other equations.

What is claimed is:

1. A method of encoding a digitized image, comprising the steps of:
    obtaining shape information of the image from a shape information generator;
    dividing the image into a plurality of resolutions;
    sampling each of the plurality of resolutions; and
    generating converted shape information according to each of the resolutions, thereby performing a one-dimensional wavelet transform on each line of the image, using the shape information.

2. The method of claim 1, wherein the shape information obtaining step includes a first detecting step for detecting a starting point of the image, and a second detecting step for detecting an ending point of the image.

3. The method of claim 2, wherein the first and second detecting steps detect the starting point and the ending point respectively of a consequent image area.

4. An apparatus for encoding a digitized image, comprising:
    a shape information generating means for generating a shape information of the image;
    a filtering means for obtaining a plurality of resolutions of the image;
    a shape converting means for generating a converted shape information according to each of said resolutions, and;
    a sampling means for sampling each of the plurality of resolutions.

5. The apparatus of claim 4, further comprising an image area detecting means for detecting a consequent image area, by detecting a starting point and an ending point of the image.

6. The apparatus of claim 4, wherein the filtering means divides the image into a plurality of frequency components.

7. The apparatus of claim 6, wherein the sampling means comprises a plurality of sampling circuits, each of said sampling circuits sampling the output of one of said plurality of filtering means.

8. A method of encoding a one-dimensional image signal of a line of a picture, the image signal consisting of a first plurality of digitized pixels forming an image, and a second plurality of non-image forming pixels external to the first plurality of pixels, said method comprising the steps of:
    generating shape information based on the picture from a shape information generator, said shape information describing a shape of the image by indicating a part of the image signal corresponding to the first plurality of digitized pixels;
    detecting a consequent image area of the image, the consequent image area consisting of an area filled by the first plurality of pixels;
    separating a low frequency component from a high frequency component of the image signal;
    sampling said low and high frequency components of the image signal, the samples of said low frequency component of the image signal consisting of a first discrete group of pixels included in the first plurality of pixels, and the samples of said high frequency component of the image signal consisting of a second discrete group of pixels included in the first plurality of pixels and not within the first discrete group of pixels; and
    generating new shape information corresponding to the positions of the first plurality of pixels in said consequent image area, whereby a one-dimensional wavelet transform of each line of the picture is obtained.

9. The method of encoding a one-dimensional image signal according to claim 8 wherein the step of detecting a consequent image area of the image includes detecting a starting point pixel and an end point pixel of said first plurality of pixels, the remaining pixels of said first plurality of pixels being located outside of said starting and end point pixels.

10. The method of encoding a one-dimensional image signal according to claim 8 wherein the pixel of said first discrete group constitute every other pixel of said first plurality of pixels, and the pixels of said second discrete group are interposed between the pixels of said first discrete group.

11. The method of encoding a one-dimensional image signal according to claim 10 which further comprises the step of storing the sampled outputs of said low and high frequency components of said image signal, and storing shape information for the first and second discrete groups of pixels.

12. An apparatus for encoding a one-dimensional image signal of a line of a picture, the image signal consisting of a first plurality of digitized pixels forming an image, and a second plurality of non-image forming pixels external to the first plurality of pixels, comprising:

- a shape information generator, said shape information generator having an output describing the shape of the image by indicating a part of the image signal corresponding to the first plurality of digitized pixels;
- a shape adaptive wavelet transformer, including
    an image area detector having the image signal and the output of said shape information generator input thereto, said image area detector detecting a consequent image area of the image, the consequent image area consisting of an area filled by the first plurality of pixels, said image area detector further outputting the starting and end point pixels of said first plurality of pixels, the remaining pixels of said first plurality of pixels being located outside of said starting and end point pixels;
    low pass and high pass filters receiving the image signal from said image area detector, said low and high pass filters separating low and high frequency components of said image signal;
    a shape converter receiving said starting and end point pixels from said image area detector; and
    first and second sampling circuits coupled to said low pass and high pass filters respectively, said first sampling circuit generating a first discrete group of pixels constituting every other pixel of said first plurality of pixels, and said second sampling circuit generating a second discrete group of pixels constituting every other pixel of said first plurality of pixels interposed between the pixels of said first discrete group of pixels; and
    first, second and third memories for storing the outputs of said shape converter, said first sampling circuit and said second sampling circuit respectively, whereby a one-dimensional wavelet transform of each line of the picture is obtained.

* * * * *